July 12, 1966
S. N. SCHLEIN
3,260,487
LINE SUSPENSION
Filed Feb. 17, 1964
3 Sheets-Sheet 1
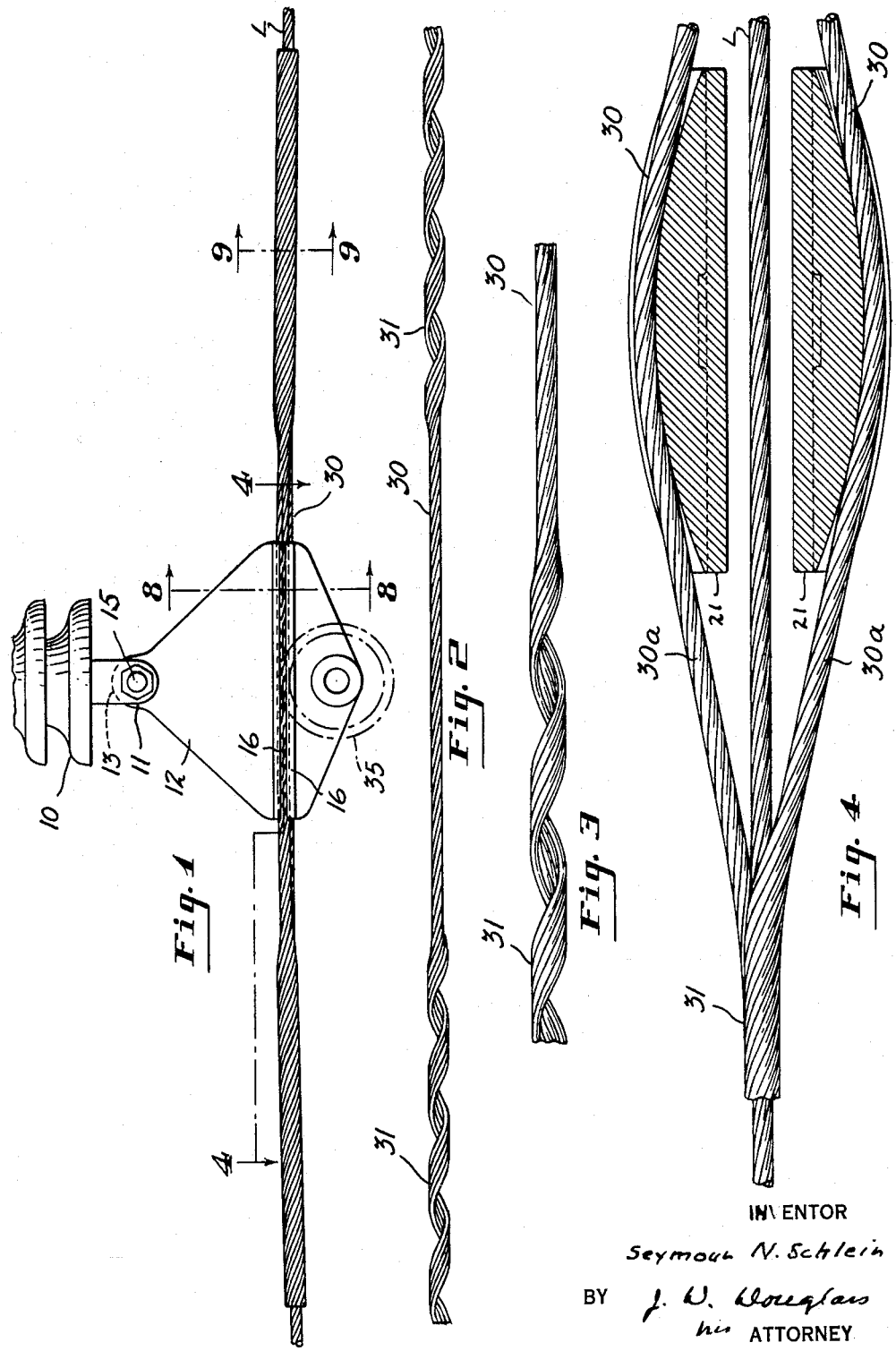
INVENTOR
Seymour N. Schlein
BY J. W. Douglass
his ATTORNEY

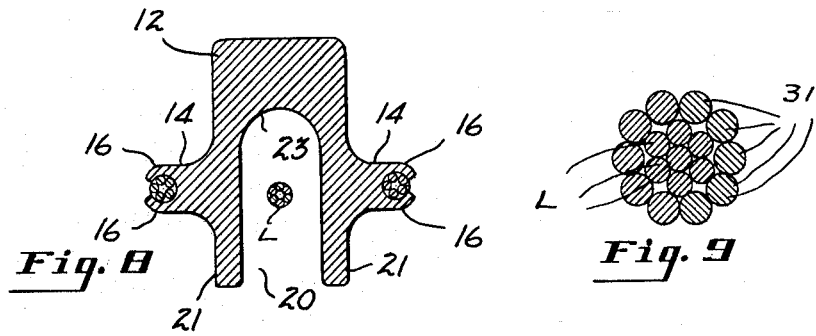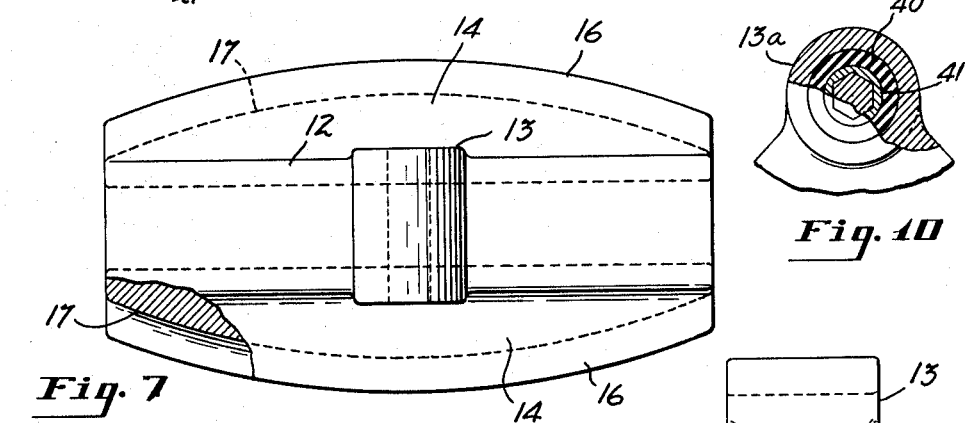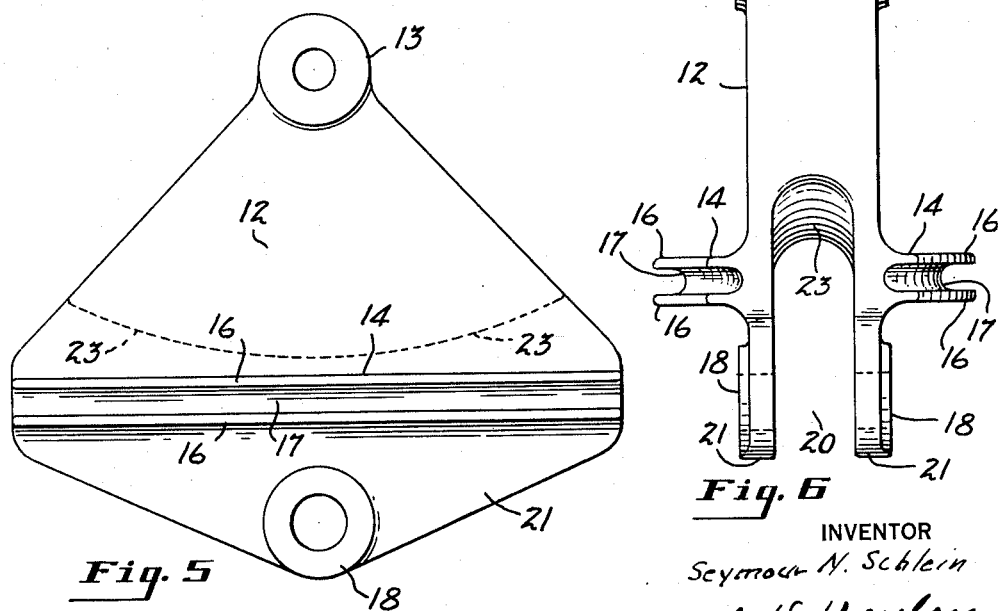

July 12, 1966　　　S. N. SCHLEIN　　　3,260,487
LINE SUSPENSION

Filed Feb. 17, 1964　　　　　　　　　　3 Sheets-Sheet 3

INVENTOR
Seymour N. Schlein
BY J. D. Douglas
His ATTORNEY

United States Patent Office 3,260,487
Patented July 12, 1966

3,260,487
LINE SUSPENSION
Seymour N. Schlein, University Heights, Ohio, assignor to
The Fanner Manufacturing Company, a Division of
Textron, Inc., Cleveland, Ohio, a corporation of Rhode
Island
Filed Feb. 17, 1964, Ser. No. 345,225
20 Claims. (Cl. 248—63)

This invention relates to improvements in line suspensions and more particularly to a means for suspending a catenary from the cross arm of a pole or tower, such as are used for the transmission of electrical power or other purposes.

As is well known to those versed in the art, lines for transmitting electrical power are strung between towers. At the tower the lines must be suspended from the cross arms and this requires a suspension means for connecting the line to the cross arm. Normally the suspension means includes an insulator, or a string of insulators, having the upper end secured to the cross arm and carrying at its lower end a saddle in which the line is laid. The saddle is usually pivotally connected to the insulator and the line secured in the saddle by suitable clamp means such as U bolts which surround the line, extend around or through the saddle, and clamp the line in the saddle.

The clamp means applies a concentration of the force on the line which, due to the swinging or vibration of the line, results in a working or bending of the line at the clamp means. Eventually this "working" causes the line to fatigue and break at the clamp. Naturally when such a line breaks it falls to the ground and the result is a discontinuance of the power. The broken line is also an electrical shock hazard to persons who might touch the line if it was "hot." Frequently very long spans are required where it must span a river, bay, road or where towers cannot be placed on property. In such instances, it is highly desirable to provide a form of protection in event of line breakage that is greater than normally required to prevent the line from falling.

Means have been proposed to prevent the line from falling, which includes one or more short pieces of line which jumpered the saddle and were clamped to the line on each side of the saddle. It has also been proposed to armor the line at the point where it is connected to the saddle. Examples of the armoring means are shown in Patent No. 2,275,019, and suspension means in Patents Nos. 2,732,393 and 2,947,504. Each of the devices required the assembly of the rods and their appurtenances to the line prior to their connection to the saddle or support. This was time-consuming and expensive. Usually it was impossible from casual inspection to determine whether such means had failed until the actual failure occurred and the line dropped.

By the present invention the usual saddle and its clamp are eliminated. The device is quick and easy to apply by persons with limited experience. Of particular importance is the fact that the line is supported in such a manner that there are no bending strains placed thereon, due to contact with the usual saddle, and the effect of such bending stresses as there are, are minimized by being distributed over a large area.

Another important feature is the fact that should failure occur, there is a large margin of safety because one or more parts may fail and the other parts still retain their holding power and prevent the line from falling during which time the partial failure of the parts may be detected during the usual current inspection and the part replaced before the line does fall.

Another important feature is that due to the manner of combination with the line there are inherent vibration dampening effects which act in opposition to the vibration of the line to reduce the amount of vibration and increase the life.

Still other advantages of the invention, and the invention itself, will become more apparent from the following description of an embodiment thereof which is illustrated in the accompanying drawings and forms a part of this specification.

In the drawings:

FIG. 1 is a side elevational view showing a fragment of a transmission line and the suspension means of the invention connected thereto and to a string of insulators shown in fragment;

FIG. 2 is a side elevational view of a preformed element as used in the invention;

FIG. 3 is an enlarged fragmentary elevation of an end portion of the element of FIG. 2;

FIG. 4 is an enlarged section taken on the line 4—4 of FIG. 1;

FIG. 5 is an elevational view of a hanger member prior to assembly with the preformed elements of FIG. 2;

FIG. 6 is an end elevational view thereof;

FIG. 7 is a top plan view thereof with a portion broken away;

FIG. 8 is a section on the line 8—8 of FIG. 1;

FIG. 9 is an enlarged section on the line 9—9 of FIG. 1;

FIG. 10 is a fragmentary view, partly in section and partly in elevation, of a modification of the hanger;

Figure 11:
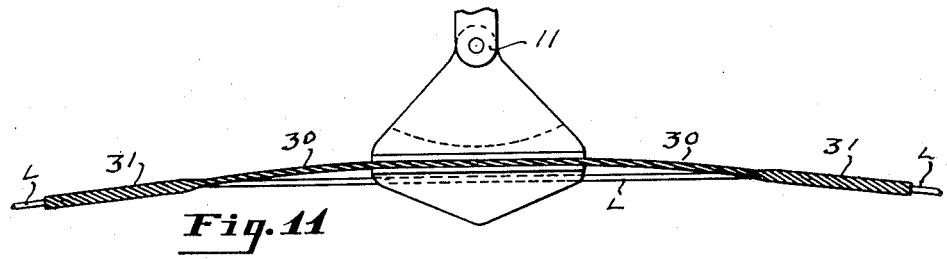
FIG. 11 is a view, largely diagrammatical of a form the invention may take.

Briefly, the invention contemplates the combination of a hanger and a plurality of preformed armor rods to provide a suspension unit which may be attached to a line by wrapping the rods around the line.

As is well known to those versed in the art, electrical power transmission lines are usually suspended from a cross arm on a pole or tower. Attached to the cross arm is an insulator string or stack 10, the bottom end of which is provided with a suitable clevis 11 to which a saddle is usually secured. Examples of such devices are shown in Patents 1,966,414 and 1,935,573. In the prior devices, the line was laid in the saddles and secured by suitable clamp means such as U bolts. Sometimes the line was reinforced at the place where it was engaged in the saddle. One type of reinforcement also consists of armoring, the armoring being comprised of a plurality of preformed helical rods, which are of the character shown in Patent 2,609,653, and wrapped around the line to provide a protective sheath. Sometimes the rods were used with other appurtenances, as shown in Patent 2,722,393.

In the present invention the usual saddle is replaced with a hanger, FIGS. 5 to 7 inclusive, which comprises a body 12 having an eye 13 at its upper end, which is pivotally secured to the eye 11 on the bottom of the insulator string by a through bolt 15. The body gradually increases in length from the eye 13 to a point spaced from the bottom end. At its longest dimension it is provided on opposite sides with outward longitudinally extending curved projections 14. The projections are widest at a vertical centerline through the body and curve inward toward the ends of the body. The extremity of each projection is provided with a pair of spaced parallel flanges 16, defining a longitudinally extending groove 17 therebetween. If desired, the flanges which define the groove may be more widely spaced apart at the ends to provide a groove which flares outwardly at the ends. The body then extends below the projections, the edges slanting back toward the vertical centerline rather abruptly and terminating in eyes 18.

Lengthwise of the body there is provided an upward and longitudinally extending groove 20, which bisects the body and provides a pair of downwardly extending legs 21, the lower ends of which are provided with the eyes 18. The wall 23, defining the upper end of the groove, is curved transversely throughout its length and is also curved longitudinally, as best shown in FIGS. 5 and 6. The dimensions of the grooves 17 and 23 may vary within wide limits, that of the groove 17 being determined by the armor rod assembly which is held therein as later described, and that of the groove 23 largely by the size of the line which is to be suspended.

The line attaching means, in its preferred form, as shown in FIG. 2, includes the assembly of a plurality of armor rods into a partial lay, which may be a half lay, with a hard twisted center zone. As disclosed in Patent 2,609,653, armor rods useful in constructing the device of this invention, are usually made of hard, resilient wires which are preformed into an open helix having an internal diameter slightly less than that of the line to which they are to be attached and having a pitch direction that is the same as that of the line and a pitch length that is less than the pitch of the individual strands of the line. It is also contemplated that the pitch length and direction may vary. The pitch length may be same or shorter or longer than that of the line and the direction of pitch may be opposite to that of the line. Such wires are also capable of being applied to the line from their sides without permanent deformation. These wires are assembled into a partial lay, preferably there should be enough wires to form a half lay which is assembled by intertwisting the wires so that they provide such a partial lay, after which they are sprayed with a suitable adhesive which retains the wires in their half or partial lay assembly. The interior of the lays may also have a gritty material to enhance the gripping power but such material may be omitted. Such assemblies are well known in the art.

After the assembly is so made, it is preferred that a center zone of the partial lay be twisted to provide a hard twisted portion 30, FIG. 2, to provide a cable-like structure in this zone, which is of sufficient length to extend beyond the confines of the groove 17. The ends 31 beyond the hard twist, retain their original partial lay configuration.

The hard twisted zone 30 is then laid in the groove 17 and the flanges 16 bent around the hard twist portion 30, to securely grip the elements throughout the length of the groove 17. In the case where the groove flares outwardly at the ends the gripping of the elements would be only in the mid-portion and the element would be free to move between the end parts and thus not present any abrupt or sharp edges to cause chafing of the element. This, then, provides a hanger having a pair of elements on each side which thus becomes a unit with the hanger and provides two separate sets of partial lay armor rods extending longitudinally from the ends of the hanger.

It is pointed out that the use of the gripping elements formed as in FIG. 2 is preferred but that modifications thereof will be apparent. For instance, instead of the hard twist, the rods could have the same conformation throughout their length and the flanges 16 deformed to engage the half lay. This could be a uniform deformation or it could be such that it would follow the helical conformation of the partial lay. Another expedient that would be obvious would be to place a filler, which could be a short length of rod of plastic or metal, in the partial lay, such as is shown in Patent No. 2,761,273, which would be of substantially the same length as the groove 17 and then upset the flanges 16 to cause them to encircle the partial lay and the filler. Another expedient would be to assemble short lengths of helical rods with the longer rods to provide a full lay in the zone 30, as shown in Patent No. 2,761,273, and then upset the flanges to grip the full lay zone. In the above modification the groove 17, defined by the flanges 16, should be large enough to encompass the reinforcement and the full lay when formed as stated.

Any of the above constructions would eventually result in a hanger with the partial lay pairs extending from the ends and it will be apparent that the curvature of the grooves 17 is such that each of the pair of partial lay elements, where they extend from the ends of the hanger, also converge toward each other. It is preferred that the elements 30–31 be so assembled in the hanger that the helices in the parts 31 are 180° out of phase with each other. When such elements are assembled with the line, they are in balanced relation to each other on opposite sides of the line.

The unit so assembled in the factory is sent into the field where they may be attached to the insulator strings by the bolt 11. The line L is then raised into position between the legs 21 and into the groove 20 opposite to the grooves 17. The separate legs of the gripping units are then wrapped around the line, as shown in FIGS. 1 and 4. If the legs 31 are half lay legs, then the line is substantially completely covered on opposite sides from the hanger, as shown in FIG. 9. If the phase of the open helices of one of the elements is 180° out of phase with the other element, then the wrapping is facilitated and a balanced assembly is obtained. When the tension on the line is relieved, the gripping parts 31 support the line and prevent longitudinal movement of the line in either direction.

The lower eyes 18 of the hanger serve a useful function during installation, for they provide a clevis which permits the installation of a sheave 35, shown in dotted lines in FIG. 1, and the line may be reeved above the sheave and below the top of the groove 23, the curvature of which groove and sheave assisting in this operation. The sheave may be left in position or it may be removed after the line is installed.

Other modifications of the same will be obvious, such as having the grooves 17 widen toward the ends so that the hard twist portion may partake of movement as previously described.

Figure 12:
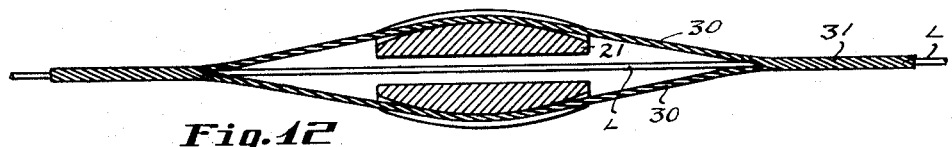
FIG. 12 is a plan view thereof with hanger shown in section.

The hard twist zone 30 is shown as long enough in FIG. 1 so that it extends well beyond the confines of the hanger. It may extend the full distance to the points where it surrounds the line, as also shown in FIGS. 11 and 12.

Figure 13:
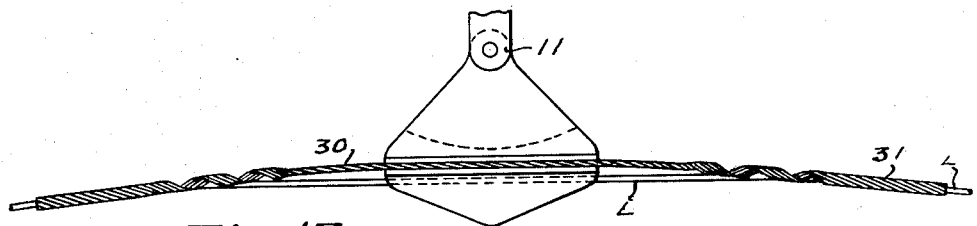
FIGS. 13 and 14 are views similar to FIG. 11 of other modifications.
Figure 14:
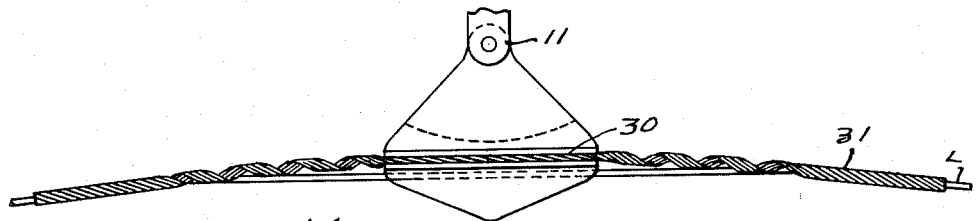

Another configuration is shown in FIG. 13 where the hard twist 30 extends beyond the hanger and a short section of open half lay is provided between the hard twist and the part which engages the line. The hard twist may be made a shorter length which is only coextensive with the groove, as shown in FIG. 14, in which event the half lay portions between the hard twist part and the place where they engage the line provide a highly resilient suspension.

In all the embodiments described, several improved results are realized, among which may be enumerated the following: vibrations of the lines are absorbed by the inherent springiness of the helices between the hanger and the point where they surround the line. The rods, where they surround the line, provide a weight which is coaxial with the line and the parts 30 act as spring levers which are rigidly held at the hanger and this provides vibration damping as well as absorption.

Another feature is illustrated in FIG. 10, wherein torsion means is incorporated between the hanger and its support. In this instance, the eye 13a has a sleeve of resilient material 40, such as rubber or one of the synthetics, bonded to eye and a central sleeve 41. The sleeve 41 is provided with a polygonal bore, and a bolt with polygonal portions which engages similar holes in the eye 11 as well as the sleeve, and thus although the hanger can be swung about the pivot, it is resisted in its movement by the rubber torsion member 40. Vibration is thus resisted by the rubber and counteracted by the torsional stresses set up therein.

Figure 15:
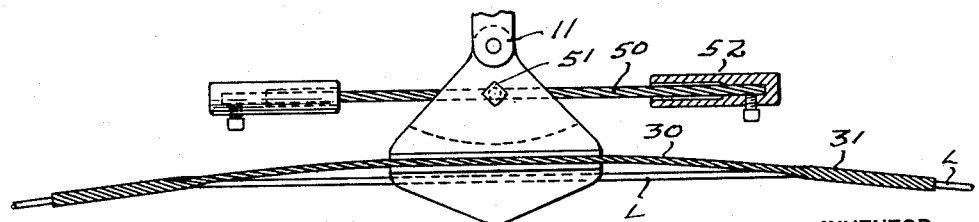
FIG. 15 is a view of a modification thereof.

FIG. 15 illustrates another combination where the vibration damping qualities of the assembly of FIGS. 1 and 11 are augmented by additional damper means which comprises a resilient rod-like element 50 which is secured in the hanger by a set screw 51, and has weights 52 secured on the ends of the rod. Vibration from the line to the connectors 31 are absorbed by the combination of the coaxial weight 31 and the springiness of the parts 30. When the vibrations are such as to cause movement of the hanger, these are damped by the assembly 50–52. In addition, the rubber torsion means of FIG. 10 may also be used.

Having thus described the invention in an embodiment thereof, I am aware that numerous and extensive departures may be made therefrom without departing from the spirit or scope of the invention as defined in the appended claims.

I claim:

1. A line suspension means comprising the combination of a hanger suspended from a support and a pair of line gripping elements carried by the hanger, each of said line gripping elements being comprised of a plurality of hard drawn resilient rods each formed into an open helix and having a pitch such that it may be applied to the line from its side without permanent deformation, said rods being intertwisted to form a partial lay; each one of said pair of gripping elements being secured intermediate its ends to the hanger with free portions of said partial lays extending in opposite directions beyond the extremities of the hanger and opposite to each other and engaged with the line by wrapping around the line spaced from the hanger.

2. A device as described in claim 1, wherein said line gripping elements are secured to the hanger on opposite sides thereof.

3. A device as described in claim 2, wherein said hanger is provided with a slot extending from the bottom upward and longitudinally thereof and above the point where said gripping elements are secured, said slot being of sufficient width to allow free passage of the line between the wall of the slot.

4. A device as described in claim 3, wherein said slot curves upwardly toward its ends.

5. A device as described in claim 3, wherein a portion of the hanger extends below the point where the gripping elements are secured and means is disposed between the walls of the slot for furnishing a temporary support for the line prior to and when the free lay portions are being wrapped around the line.

6. A device as described in claim 3, wherein a portion of the hanger extends below the point where the gripping elements are secured and a sheave is disposed between the walls of the slot with the uppermost circumference of the sheave spaced from the top of the slot for furnishing a support for the line prior to and when the free lay portions are being wrapped around the line.

7. A device as described in claim 3, wherein the upper wall of said slot curves upwardly from the mid-section of the hanger toward its ends.

8. A device as described in claim 1, wherein the hanger is formed with outwardly extending projections on opposite sides, each of said projections being formed with outwardly extending flanges on its extremities defining a groove and said gripping elements are secured in said groove.

9. A device as described in claim 8, wherein said projections are of greater width at the mid portion of the hanger and decreases in width toward their ends.

10. A device as described in claim 8, wherein the walls of said groove are in spaced parallel relation throughout their length.

11. A device as described in claim 8, wherein the walls of said groove are parallel to each other at the mid-section of the hanger and diverge outwardly from each other at their ends.

12. A device as described in claim 1, wherein said gripping elements at the point where they are secured to the hanger are deformed prior to installation by twisting to provide a hard twisted zone at the hanger.

13. A device as described in claim 1, wherein said gripping elements are reinforced at the point where they are secured to the hanger.

14. A device as described in claim 1, wherein said rods are twisted at their mid-portion to provide a hard twisted portion and are secured to the hanger at said hard twisted portion.

15. A device as described in claim 14, wherein said hard twisted portion extends beyond the hanger to the point where the partial lays are wrapped around the line.

16. A device as described in claim 14, wherein said hard twisted portion extends outwardly from the hanger and an open lay portion is provided between the hard twisted portion and the parts that wrap around the line.

17. In combination with a line and a support having an eye clevis at the bottom and means for suspending the line from the support and damping vibrations in the line comprising a hanger consisting of a body, the upper end of which is provided with an eye for engagement in said clevis, resilient torsion means disposed between the eye of the support and the eye of the hanger and secured against movement at said eyes, a pair of elongated wire gripping members of resilient material carried by said hanger body at their mid sections, each of said members extending outwardly from the ends of said body in opposite directions and being wrapped around the line spaced from the hanger.

18. A device as described in claim 17, wherein the resilient torsion means comprises a sleeve of resilient material having the outer surface secured to the inner wall of the eye and having a rigid inner sleeve secured to the inner surface and means for locking the inner sleeve to the eye of the support.

19. In combination with a line and a support, means for suspending a line from the support and damping vibration of the line comprising a hanger consisting of a body having the upper end secured to the support, a pair of elongated wire gripping members of resilient material carried by the hanger in spaced relation to each other, each of said members extending outwardly of said body in opposite directions and wrapped around the line spaced from the hanger and forming weights concentric with the line spaced from the hanger and comprising a first vibration damping means, and second vibration damping means including resilient means secured to the hanger and extending outward over said line and weight means disposed on the opposite ends of said resilient means.

20. A device as described in claim 19, wherein the hanger is secured to the support by a third vibration damping means comprising resilient torsion means.

References Cited by the Examiner

UNITED STATES PATENTS 2,587,521  2/1952  Peterson _____ 174—42 X
2,729,054  1/1956  Peterson.

FOREIGN PATENTS 567,131  12/1958  Canada.
702,244  1/1931  France.
1,136,003  12/1956  France.

ROBERT K. SCHAEFER, *Primary Examiner.*

JOHN F. BURNS, *Examiner.*

J. F. RUGGIERO, *Assistant Examiner.*